United States Patent [19]

Dutkiewicz et al.

[11] Patent Number: 5,197,339
[45] Date of Patent: Mar. 30, 1993

[54] DEVICE FOR MEASURING TORQUE IN A UNIVERSAL JOINT AND METHOD THEREFOR

[75] Inventors: Jeffrey A. Dutkiewicz; James T. Reynolds, both of Toledo, Ohio

[73] Assignee: Dana Corporation, Toledo, Ohio

[21] Appl. No.: 768,375

[22] Filed: Sep. 27, 1991

[51] Int. Cl.⁵ .............................................. G01L 3/02
[52] U.S. Cl. ........................ 73/862.191; 73/862.08
[58] Field of Search .................. 73/862.191, 862.21, 73/862.23; 403/11; 464/125, 136, 185

[56] References Cited

U.S. PATENT DOCUMENTS

| | | | |
|---|---|---|---|
| 2,337,546 | 12/1943 | Cox | 73/862.08 |
| 3,438,135 | 4/1969 | Bense | 33/600 |
| 3,465,449 | 9/1969 | Wideburg et al. | 33/600 |
| 3,956,930 | 5/1976 | Shoberg | 73/862.04 |
| 4,790,079 | 12/1988 | Meyers | 33/517 |

OTHER PUBLICATIONS

Torque Gauge Set, Hayes-Dana Inc., Thorold, Ontario, Canada (Jan. 1986).

Primary Examiner—Michael T. Razavi
Assistant Examiner—Elizabeth L. Shopbell

[57] ABSTRACT

This invention is directed to a device and method for checking the torque of a journal cross and bearings combination. The device comprises means for clamping a universal joint, means connectable to the clamping means and through which torque is applied to the universal joint, the connecting means having means for sensing the amount of torque required to rotate the cross-member and for measuring the amount of torque sensed. The method includes the steps of positioning and clamping the device to the universal joint in relation to the cross-member of the universal joint, applying torque to the device until the cross-member rotates with the universal joint, and measuring the torque required to initiate rotation.

7 Claims, 2 Drawing Sheets

DEVICE FOR MEASURING TORQUE IN A UNIVERSAL JOINT AND METHOD THEREFOR

BACKGROUND OF THE INVENTION

This invention relates to a device and method for checking the rotational torque of a journal cross and bearings combination.

Gauge devices exist which measure the amount of torque required to rotate a journal riding on bearing surfaces. One device measures the amount of torque necessary to rotate the outboard yoke of a drive shaft universal joint about the trunnions passing through its lug ears. Such a gauge device is adapted to sit on one outboard yoke lug ear. It is operated by holding the device against the lug ear of the outboard yoke, holding in a fixed position the universal joint cross member having the trunnions, applying torque through the device to the outboard yoke, and reading from the gauge the torque required to cause rotation. A disadvantage of this device is that it will not measure torque on the trunnion associated with the inboard yoke.

It is desireable to have a device which is relatively easy to position about a universal joint and which is self-supporting for determining, with minimal repositioning, the acceptable interaction of a cross member assembled in a yoke of the universal joint. It is also desireable that such device be capable of adapting to various types of yokes, such as a slip, yoke or a flange yoke, or in the cast of no yoke, a pair of trunnions.

SUMMARY OF THE INVENTION

The present invention provides an improved device for checking the amount of torque required to rotate a cross member assembled in either the inboard or the outboard yoke of a drive shaft universal joint assembly. The present invention is directed to a device which comprises means for clamping to a universal joint, means connectable to the clamping means and through which torque is applied to the universal joint, the connecting means having means for sensing the amount of torque required to rotate the cross member in the yoke of the universal joint and for measuring the amount of the torque sensed.

Also, a method for determining the amount of torque required to rotate a universal joint in a drive line assembly is provided. The method includes the steps of positioning and clamping a device on a universal joint in relation to the cross member of the universal joint, applying torque to the device until the cross member rotates within the universal joint, and measuring the torque required to initiate the rotation.

DETAILED DESCRIPTION OF THE PREFERRED EMBODIMENT

Figure 1:
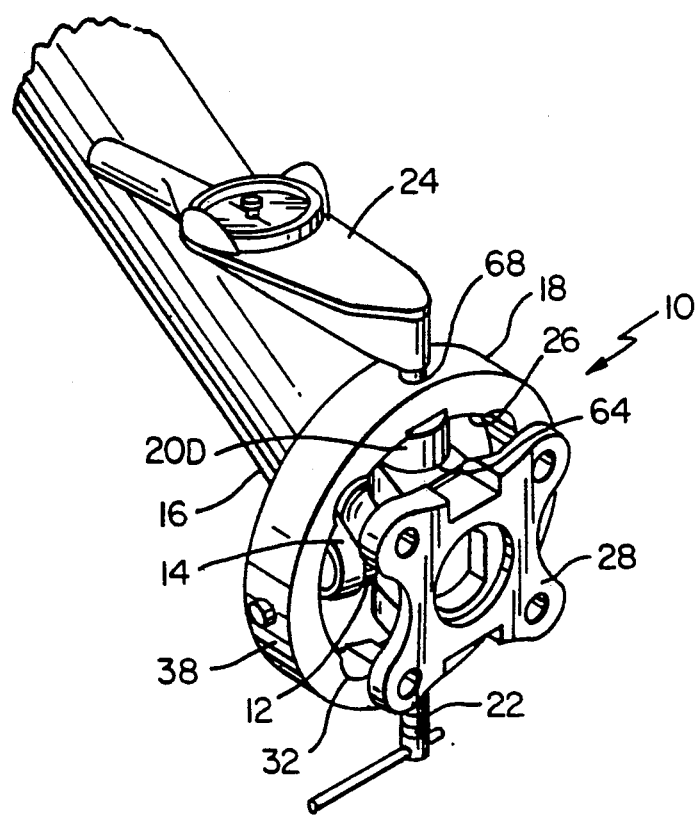
FIG. 1 is a perspective view of the present invention connected to a universal joint in a drive line assembly.

Referring to the drawings, device 10 for checking the amount of torque required to rotate cross member 12 journalled for rotation in yoke 14 of universal joint 16 is shown as including a ring-like body 18, cylindrical puck-like adapters 20, threaded shaft 22, and dial type torque wrench 24. Ring-like body 18 has an inner opening 26 of sufficient size to allow various sizes and types of yokes to pass therethrough without interference. For example, device 10 is shown used for a flange yoke 28 in FIG. 1 and for a slip yoke 30 in FIG. 2.

Inner opening 26 of ring-like body 18 is substantially circular having additional concave portions 32, at approximately 90 degrees from one another. The presence of concave portions 32 permit outer yokes of generally rectangular shape, such as flange yoke 28, to pass through inner opening 26 without interference. By so shaping inner opening 26, the overall diameter of ring-like body 18 can be reduced, while maintaining the structural strength of ring-like body 18. It is desirable to minimize the overall size and weight of ring-like body 18 to maximize the accuracy of torque measurement.

Inner opening 26 includes two opposed recessed flat surfaces 34 approximately equidistant from their respective adjacent concave portions 32. The width of the each recessed flat surface 34 is sufficient to accommodate adapters 20 placed in relation thereto.

Figure 3:
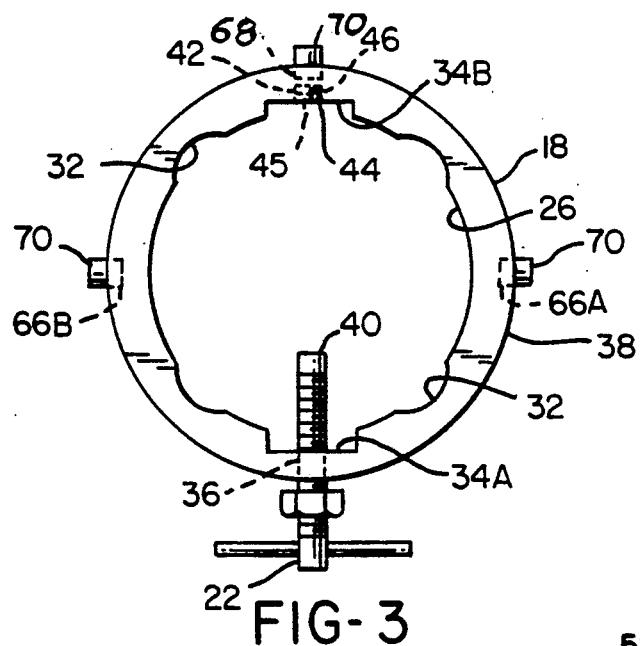
FIG. 3 is a plan view of the ring-like body and advancing member used in the present invention.

Referring to FIG. 3, threaded bore 36 extends perpendicularly from the center of recessed flat surface 34a to outer diameter 38 of ring-like body 18. Threaded shaft 22 is threaded to threaded bore 36 so that end portion 40 may be extended beyond recessed flat surface 34a when turned in one direction or retracted beneath surface 34a when threaded shaft 22 is turned in an opposite direction.

Figure 4:
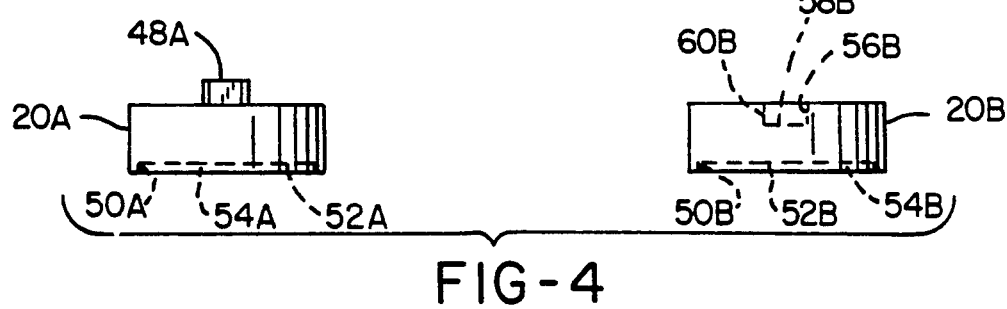
FIG. 4 is a side view of adapters used in the present invention.
Figure 5:
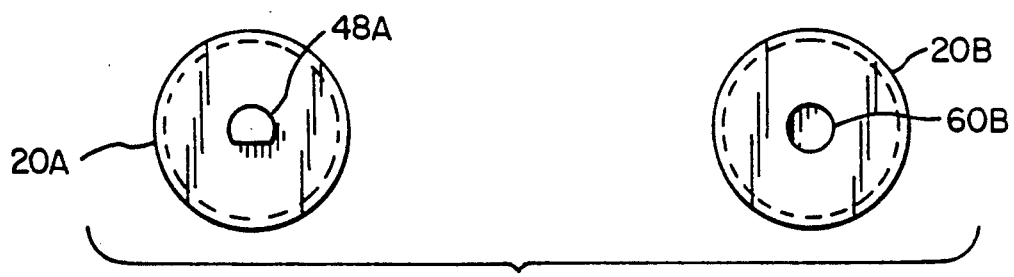
FIG. 5 is a top view of adapters used in the present invention.

Bore 42 extends radially outwardly from a central portion of recessed flat surface 34b into ring-like body 18. Walls 44 and 46 defined bore 42 which has disposed therein a set screw 45. Set screw 45 is adapted to receive extension 48a of adapter 20a as is shown in FIGS. 4 and 5.

Figure 2:
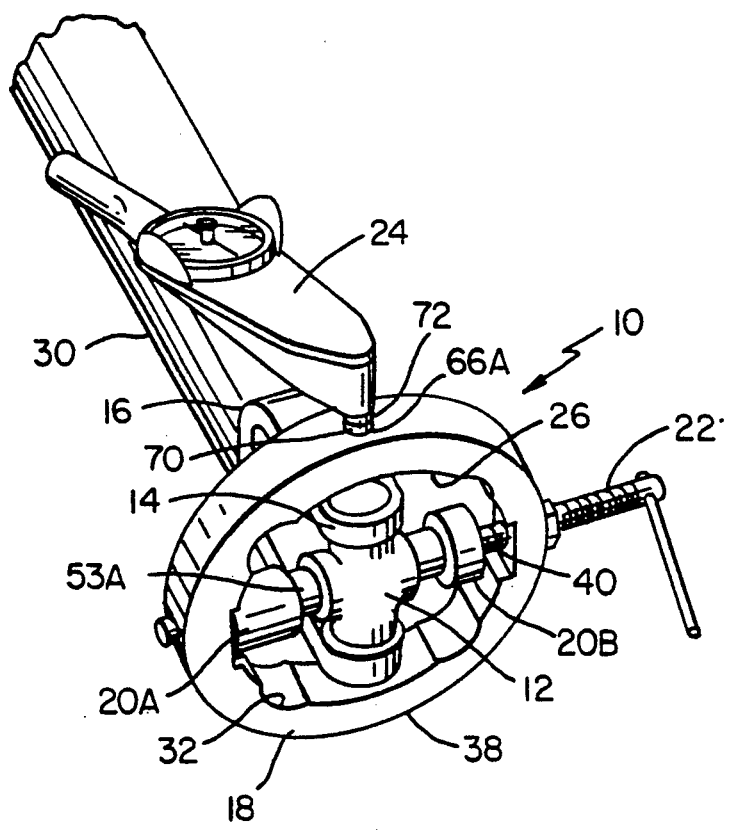
FIG. 2 is a perspective view of the present invention connected to another universal joint of a drive line assembly.

Adapter 20a has surfaces 50a and 52a which define recess 54a and is shaped to receive a trunnion 53 of cross member 12, shown in FIG. 2. Adapter 20b has a similarly formed surfaces 50b and 52b and recess 54b. Adapter 20b, has walls 56b and 58b which define aperture 60b. Walls 56b and 58b receive threaded shaft end portion 40 as threaded shaft 22 is inwardly extended through ring-like body 18 (see FIG. 2).

Trunnions 53 are surrounded by bearings (not shown) which in turn are captured by outer bearing cap with bearing cap forming an interference fit in cross hole 64 of flange yoke 28 and leaving a slight depression remaining in the top of cross hole 64.

Figure 6:
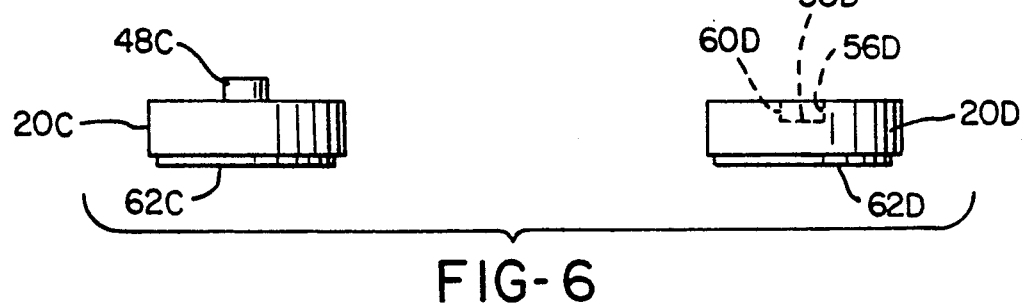
FIG. 6 is a side view of other adapters used in the present invention.

As shown in FIG. 6, adapter 20c has a similarly formed extension 48c. Adapter 20c has projecting plateau 62c which permits adapter 20c to be positioned concentrically with cross holes 64 of flange yoke 28, into remaining depression of cross hole 64.

Adapter 20d, shown on FIGS. 1 and 6, has like formed walls 56d and 58d and aperture 60d. Adapter 20d has like projecting plateau 62d.

The thickness of adapters 20 as well as the diameter and height are predetermined to match with cross member and yoke combinations of varying sizes. It is conceived that other shaped adapters can be used.

Referring to FIG. 3, bores 66a and 66b extend radially inwardly from outer diameter 38 and are placed on the circumference of ring-like body 18 at the mid-points between bores 36 and 42. Bore 68 extends radially inwardly from outer diameter 38 and is diametrically opposed to bore 42. Bores 66a, 66b and 68 have sockets 70 press fit therein.

Dial-type torque wrench 24 with its scale incremented in inch-pounds/newton-meters/ and/or kilogram-meters, as is known in the art, has end 72 matched to sockets 70 to gain purchase thereon. Torque wrench 24 is of the conventional type which retains the reading of the highest torque reached while the wrench is in use until reset.

In assembling device 10 for testing of universal joint 16, the appropriate adapters 20a and 20b, or 20c and 20d, for the particular trunnion/yoke combination are selected and fitted to respective recessed flat surfaces 34a and 34b. For example, in the case of slip yoke 30, outboard trunnions 53 fit into recesses 54a and 54b of adapters 20a and 20b, respectively. For the case of flange yoke 28, plateaus 62c and 62d are aligned with the depression remaining in the top of cross holes 64 of outboard flange yoke 28. Threaded shaft 22 is then screwed into ring-like body 18 so that end 40 extends against surface 58b or 58d, as the case may be, to securely clamp ring-like body 18, adapters 20 and threaded shaft 22 to the universal joint. A lock nut 74 is also provided to ratain orientation once clamped into position. Once secured, ring-like body 18 should be substantially coplanar with cross member 12. The axis of rotation for outboard trunnions 53a which are to be measured is perpendicular to the axis of rotation for inboard trunnions 53b. Sockets 70 in bores 66a and 66b are disposed substantially in line with and centered on the axis of rotation of the inboard trunnions 53b.

With the attachment of end 72 of torque wrench 24 to a socket 70 on bore 66a, as shown in FIG. 2, force is applied to the handle of the torque wrench 24 to cause rotation about the axis of inboard trunnions 53b. Once movement in cross member 12 is noticed and notably before cross member 12 is precluded from movement by the yoke, a torque reading of the inboard trunnions is noted and the gauge or torque wrench 24 reset. In the same fashion, torque is then applied opposite to the direction of the original torque and the torque reading is again noted. In a similar fashion, end 72 can be attached to socket 70 in bore 68 as shown in FIG. 1 and a torque reading can be obtained for the outboard trunnions 53a.

In automotive, truck and similar motor vehicle applications, a properly assembled trunnion, bearings, and yoke combination should require a preferred range of torque for rotation of the trunnion in the yoke. It is important that the torque reading be within the desired range. If, the reading is below the preferred range, this would indicate that the universal joint is too loose in its movement which will cause vibration in the vehicle. If, the reading is above the preferred range, this would indicate that the universal joint is too restricted in its movement which will cause undue wear and premature failure to of the universal joint. In either of the two cases where the reading is outside the preferred range, the universal joint can be disassembled and inspected and any defect remedied prior to installation on a motor vehicle. It is noted that preferred ranges of torque will vary with the size of vehicle and universal joint associated therewith.

This device has a special use in checking acceptable dimensions of universal joint cross members in combination with bearings and their proper assembly in the bore of the universal joint yoke by measuring the torque required to rotate the assembled cross member. This use is enhanced by the ability of the device to measure torque despite the assembly of both trunnion pairs in both the inboard and outboard yokes, and, in instances of full assembly of the universal joint, permits checking of both trunnion sets by positioning the device only with relation to the trunnions for the outboard yoke.

An advantage of the present invention is that the device can fit a number of types and sizes of universal joints by providing adapters corresponding to the cross member/yoke combination to be checked. Thus, the present invention attempts to provide a universal torque gauge. While the present invention has been set forth in a specific embodiment, it is not intended to limit the scope or nature of the invention, and it is believed that many modifications, derivations, and alterations will be readily apparent to a person skilled in the art.

What is claimed is:

1. A device for measuring the amount of torque which is required to rotate a cross member journalled for rotation in a universal joint, comprising: a surrounding member positionable adjacent the universal joint which includes means for clamping the universal joint; and means connectable to said clamping means and through which torque is applied to the cross member, said connecting means having means for sensing the amount of torque required to rotate the cross member and for measuring the amount of the torque sensed.

2. The device of claim 1, wherein said surrounding member is a annular body having an inner opening suitably configured to allow passage of the universal joint therethrough and wherein said clamping means includes;

an advancing member movably connected to said annular body; and a pair of adapters co-operable with said annular body and said advancing member to position said device such that the axes of rotation of said annular body are substantially the same as the axes of rotation of the cross member.

3. The device of claim 2, each said adapter having a recess for receiving a trunnion of the cross member of the universal joint, one of said adapters having an aperture for receiving an end of said advancing member, said other adapter having a surface configured to fit to said annular body.

4. The device of claim 2, each said adapter having a plateau portion configured to fit and extend into a depression of a cross hole of a yoke of the universal joint which houses the cross member of the universal joint, one of said adapters having an aperture for receiving an end of said advancing member, said other adapter having a surface configured to fit to said annular body.

5. The device of claim 2, wherein said annular body has a bore extending radially therethrough from said inner opening to an outer surface of said annular body, and wherein said advancing member extends through said bore.

6. A method for determining the amount of torque required to rotate a cross member journalled for rotation in a universal joint in a drive line assembly, including the steps of:

positioning and clamping a surrounding member having means for clamping a universal joint in relation to the cross member of said universal joint;

applying torque to the surrounding member until said cross member rotates within said universal joint; and measuring the torque required to initiate the rotation.

7. A method for determining the amount of torque required to rotate a cross member journalled for rotation in an universal joint comprising the steps of:

(a) positioning a annular body about the cross member of the universal joint, said annular body having an inner opening through which the universal joint will pass;

(b) connecting a plurality of adapters to said inner opening adjacent trunnions of the cross member;

(c) advancing one of said adapters so that the adjacent trunnions connect said adapters to provide support for said ring-like body and fix orientation of said annular body with respect to the cross member; and (d) applying torque to said annular body about an axis of rotation of the cross member using a gauge torque wrench to provide a measurement of the amount of torque required to initiate rotation of the cross member.

* * * * *